(12) United States Patent
De Lange et al.

(10) Patent No.: US 11,010,504 B2
(45) Date of Patent: May 18, 2021

(54) LATTICE STRUCTURES FOR ADDITIVE MANUFACTURING

(71) Applicant: SIEMENS INDUSTRY SOFTWARE NV, Leuven (BE)

(72) Inventors: Dirk Frederik De Lange, San Luis Potosi (MX); Hunor Erdelyi, Leuven (BE); Wim Van Paepegem, Zwijnaarde (BE); Alain Remouchamps, Esneux (BE)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 74 days.

(21) Appl. No.: 16/333,864

(22) PCT Filed: Sep. 26, 2016

(86) PCT No.: PCT/EP2016/072846
§ 371 (c)(1),
(2) Date: Mar. 15, 2019

(87) PCT Pub. No.: WO2018/054502
PCT Pub. Date: Mar. 29, 2018

(65) Prior Publication Data
US 2019/0205499 A1  Jul. 4, 2019

(51) Int. Cl.
*G06F 30/17*  (2020.01)
*B33Y 50/00*  (2015.01)
(Continued)

(52) U.S. Cl.
CPC .............. *G06F 30/17* (2020.01); *B22F 10/00* (2021.01); *B29C 64/153* (2017.08);
(Continued)

(58) Field of Classification Search
CPC ...... G06F 30/17; G06F 30/23; G06F 2119/18; B33Y 50/00; B33Y 10/00; B33Y 50/02;
(Continued)

(56) References Cited

U.S. PATENT DOCUMENTS

| | | |
|---|---|---|
| 2010/0262406 A1 | 10/2010 | Goel |
| 2014/0363481 A1 | 12/2014 | Pasini |
| 2015/0190971 A1 | 7/2015 | Musuvathy |

FOREIGN PATENT DOCUMENTS

EP    2778992 A1    9/2014

OTHER PUBLICATIONS

Panetta, Julian, et al. "Elastic textures for additive fabrication." ACM Transactions on Graphics (TOG) 34.4 (2015): pp. 1-12.
(Continued)

*Primary Examiner* — Darrin D Dunn
*Assistant Examiner* — Christopher W Carter
(74) *Attorney, Agent, or Firm* — Lempia Summerfield Katz LLC

(57) ABSTRACT

Design of lattice structures for additive manufacturing The present embodiments relate to additive manufacturing, such as three-dimensional printing. By way of introduction, the present embodiments described below include methods and systems for designing, modeling and manufacturing lattice structures. Lattice cells are modeled as parametrized representative unit cell (RUC) models providing a virtual material characterization for a lattice structure. The parametrized RUC models include phase functions for the virtual material characterization and identification of corresponding normalized material curves fit with polynomial functions for each lattice cell structure. Parametrized lattice models with underlying normalized lattice material curves provide design and simulation of true lattice material behavior for use in topology optimization. The topology optimization (Continued)

utilizes the normalized material curves in a penalization process and by defining lattice zones based on the printability of cells of given densities. The lattice structures are sized for geometrical accuracy and finite-element analysis may be performed with corrected beam diameters.

13 Claims, 6 Drawing Sheets

(51) Int. Cl.
G06F 30/23 (2020.01)
B22F 10/00 (2021.01)
B29C 64/153 (2017.01)
B29C 64/393 (2017.01)
G06F 119/18 (2020.01)
B22F 10/10 (2021.01)
B33Y 10/00 (2015.01)
B33Y 50/02 (2015.01)

(52) U.S. Cl.
CPC ............ B29C 64/393 (2017.08); B33Y 50/00 (2014.12); G06F 30/23 (2020.01); B22F 10/10 (2021.01); B33Y 10/00 (2014.12); B33Y 50/02 (2014.12); G06F 2119/18 (2020.01)

(58) Field of Classification Search
CPC ... B29C 64/153; B29C 64/393; B22F 3/1055; B22F 2003/1057
USPC .......................................................... 700/98
See application file for complete search history.

(56) References Cited

OTHER PUBLICATIONS

PCT International Search Report and Written Opinion of International Searching Authority dated Apr. 29, 2017 corresponding to PCT International Application No. PCT/EP2016/072846 filed Sep. 26, 2016.

LATTICE STRUCTURES FOR ADDITIVE MANUFACTURING

RELATED CASE

The present patent document is a § 371 nationalization of PCT Application Serial Number PCT/EP2016/072846, filed Sep. 26, 2016, designating the United States, which is hereby incorporated by reference.

BACKGROUND

In many engineering applications, such as aerospace engineering, high demands are put on obtaining lightweight designs while still providing high structural performance. One solution is the utilization of foams to reduce weight. However, given the manufacturing aspects of foams, it is often difficult to manufacture structural components with varying mechanical properties that meet the structural requirements of the designs. For example, typical foam structures have a homogenous density distribution leading to a homogeneous foam material. In many cases, it may be desirable to have a varying density leading to local enforcement of certain zones within structural components.

Lattice structures are an alternative to foams that also meet the weight reduction requirements. Lattice structures are porous materials produced by repeating a unit cell throughout the structure. Varying the density and size of the unit cell structures produce desired local and global mechanical properties. Lattice structures are often produced by additive manufacturing, such as three-dimensional printing. Additive manufacturing is a process of producing a three-dimensional object, such as a structural component, by depositing or forming a successive series of layers to form the structural component, typically under computer control. Current computer aided engineering (CAE) technology for designing, modeling and manufacturing lattice structures is unable to efficiently and accurately design lattice structures.

SUMMARY

The present embodiments relate to additive manufacturing, such as three-dimensional printing. By way of introduction, the present embodiments described below include methods and systems for designing, modeling and manufacturing lattice structures. Lattice cells are modeled using parametrized representative unit cell (RUC) models providing a virtual material characterization for each type of lattice cell structure. The parametrized RUC models include phase functions for the virtual material characterization and identification of corresponding normalized material curves fit with polynomial functions for each lattice cell structure. The parametrized RUC models allow for accurate and efficient virtual material characterization in order to obtain the normalized lattice material properties in from of curves. The topology optimization utilizes the normalized material curves in a penalization process. Lattice zones are also designed based on the printability of cells of given densities. The lattice structures are sized for geometrical accuracy, and finite-element analysis may be performed including a correction of numerical errors caused by using beam elements.

In a first aspect, a method for designing a lattice structure is provided. The method includes identifying a lattice model, identifying lattice zones for the lattice structure using the lattice model and determining a size for a geometry for the lattice structure.

In a second aspect, a system for designing a lattice structure is provided. The system includes a workstation configured to receive a parametrized lattice model, to identify lattice zones for the lattice structure using the parametrized lattice model and to size a geometry for the lattice structure. The system may also include a server configured to transmit the parametrized lattice model to the workstation. The parametrized lattice model is one of the plurality of parametrized lattice models. The system also includes a three-dimensional printer configured to print the lattice structure.

In a third aspect, another method for modeling a lattice structure is provided. The method includes identifying lattice zones for the lattice structure using a parametrized lattice model, sizing a geometry for the lattice structure and correcting the size of the lattice structure for finite-element modeling.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EXEMPLARY EMBODIMENTS

Figure 1:
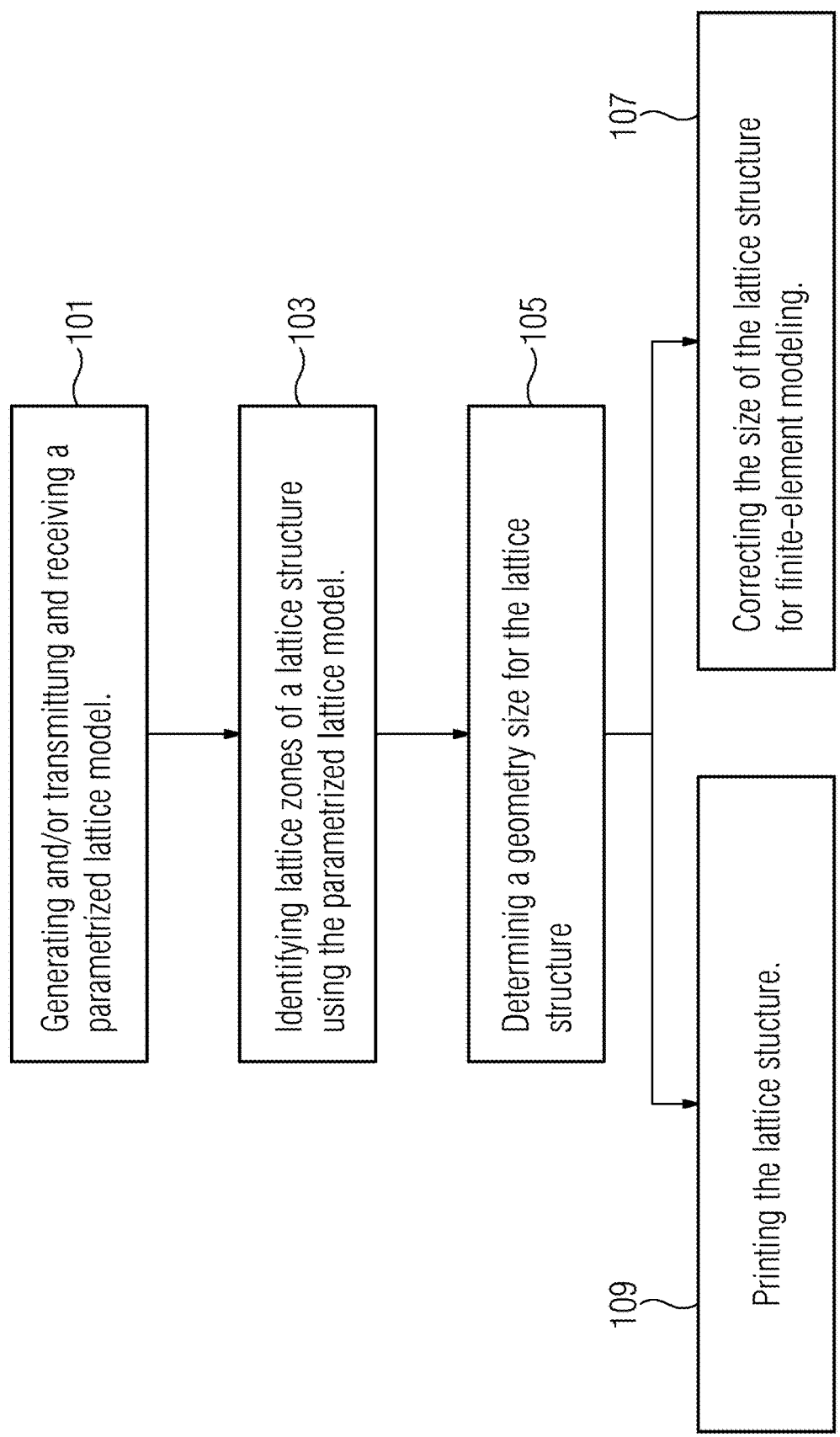
FIG. 1 illustrates a flowchart diagram of an embodiment of a method for designing, modeling and manufacturing a lattice structure.

The present embodiments may obviate one or more of the drawbacks or limitations in the related art. For example, a computer aided engineering (CAE) solution is provided to efficiently and accurately design a structural component by determining where to provide lattice structures and what lattice cell geometry size for the lattice structures provide optimal structural performance for the component.

The present embodiments provide a design process utilizing lattice material characteristics throughout the entire design process, and manufacturing characteristics to identify lattice zones within a structural component. Virtual material characterizations of various types of lattice cells are provided using parametrized representative unit cell (RUC) models. The virtual material characterization process may generate a parametrized lattice model containing normalized material curves used throughout the process to maintain the correct modeling of the lattice material. The RUC models are parametrized in order to be able to efficiently model the full density spectrum of a lattice cell: (0% . . . 100%]. The virtual material characterizations of the lattice cells uses the parametrized RUC models and corresponding phase functions to efficiently derive accurate normalized material curves, fit with polynomial functions, for each type of lattice cell, allowing the design process to accurately model the lattice cell material behavior. Using this true lattice material behavior modeling, topology optimization is performed. The topology optimization optimizes the location and density of the lattice structure. Zones for the lattice structures are defined using the identified normalized material curves in a penalization process and by considering printability of cells of given densities. The lattice structures are sized for geometrical accuracy. The geometry of the lattice structures may also be corrected for finite-element analysis (FEA) using corrected beam diameters. For example, analytical curves defining the beam diameters within a cell are used to achieve the cell density prescribed by topology optimization, and the beam diameters are corrected to provide accurate simulations in the finite-element analysis. For example, beam diameters in the design are corrected, compensating for joints between trusses and aspect ratio influence.

As such, the present embodiments provide that lattice material properties are used in each stage of the design process, such as during topology optimization and lattice sizing for both actual printable design as well as accurate simulations. The lattice design process may provide the ability to design a lattice structure with trusses of varying thicknesses, providing different stiffnesses and other material properties at different locations, or zones, of the structural component. The user may easily make design changes by using different lattice models from a library of models characterizing various lattice structures, providing different normalized material curves for use throughout the process to maintain the correct modeling of the lattice material. Sizing of the lattice trusses may also be obtained directly and efficiently using analytical functions, maintaining the true material properties, ensuring a correct match with the density distribution calculated by the topology optimization process and thus avoiding the necessity for a sizing optimization loop. The lattice sizing may be corrected for FEA, accounting for the deficits of modeling lattice with beams.

Further, the present embodiments may allow for topology optimization to reach a fully converged state. By treating the entire design space as a homogenous lattice material, the topology optimization determines optimized lattice zones by performing a sufficient number of iterations for a fully converged solution. The present embodiments may also allow for different lattice cell designs to be utilized, such as cubic, octet, dodecahedron, etc. Using the different lattice designs, accurate lattice cell material property laws are used throughout the design process, including sizing the lattice geometry. The present embodiments may additionally provide a generic lattice representation using different polynomial curves for each lattice type. The parameters of the polynomial curves are identified with a dedicated parametrization process, allowing any type of lattice cell to be identified. Accurate simulations are provided in computer aided engineering (CAE) modelling by representing lattice beams in finite-element analysis (FEA), providing accurate truss joint effects, aspect ratio influence, and correcting volume fraction error introduced by the beam modeling.

FIG. 1 illustrates a flowchart diagram of an embodiment of a method for designing, modeling and manufacturing a lattice structure. The method is implemented by the system of FIG. 6 (discussed below) and/or a different system. Additional, different or fewer acts may be provided. For example, acts 101, 107 and/or 109 may be omitted, such as to design a lattice structure using existing parametrized lattice models and without finite-element analysis and printing. The method is provided in the order shown. Other orders may be provided and/or acts may be repeated. For example, acts 101-109 may be repeated to design a different lattice structure using a different parametrized lattice model. Further, the acts may be performed concurrently as parallel acts. For example, after act 105, the lattice geometry design is ready for printing. Thus, acts 107 and 109 may be performed concurrently by performing finite-element analysis (e.g., with the beam diameters of the design corrected to check how the design performs under certain loads) and printing a structural component using the design.

At act 101, one or more parametrized lattice models are generated, transmitted and/or received. Such a parametrized lattice model contains the normalized material curves used throughout the process to maintain the correct modelling of the lattice material. For example, a server or workstation may generate the parametrized lattice models. Alternatively, the server may generate and/or store the lattice models for transmission to the workstation for modeling.

The parametrized lattice models are provided as a representative unit cell that, when repeated, produces a lattice structure. The parametrized lattice model used in the exemplary method may be one of a plurality of parametrized lattice models provided in a library of lattice models. The parametrized lattice model may be selected for the design process based on the material curves assigned to it, based on the shape of the lattice, and/or based on other material properties of the lattice cell. Some of the homogenized material properties assigned to the parametrized lattice model include a Young's modulus curve, a shear modulus curve and a Poisson's ratio curve for the lattice structure. The curves may be normalized, such as providing a normalized Young's modulus curve as a function of relative densities of cells of the parametrized lattice model. The material properties of the lattice cell provide accurate characteristics of the cell structure.

Figure 2:
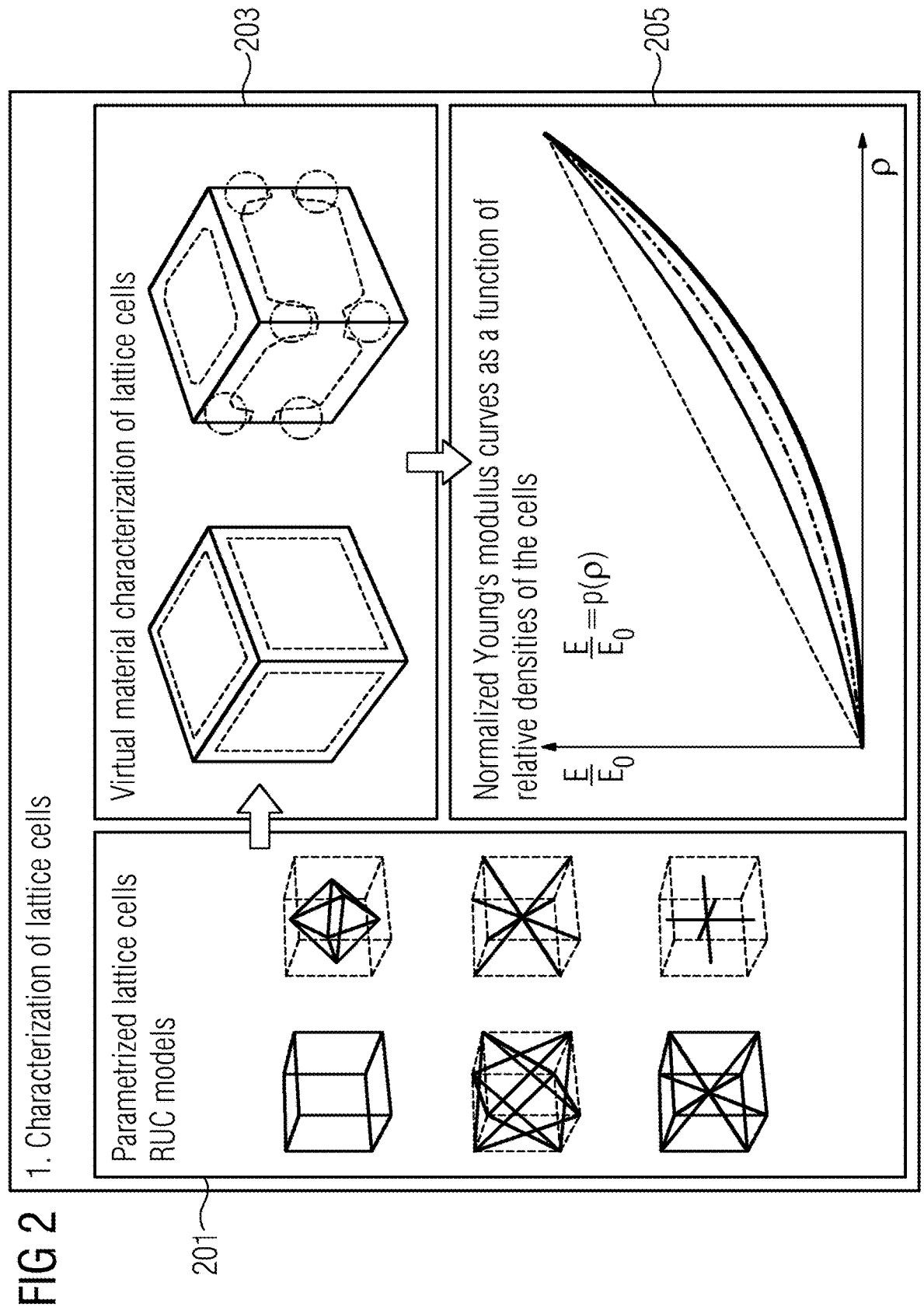
FIG. 2 illustrates an example of characterizing a lattice cell structure.

FIG. 2 illustrates an example of the characterization of a lattice cell structure. For example, various parametrized lattice RUC models 201 are depicted. Other models may be provided, allowing any lattice cell shape to be modeled and used for designing a lattice structure. A library of parametrized lattice RUC models may be generated and stored prior to the design process. For example, the lattice cells may be characterized in an offline, pre-investment phase prior to the design phase. Alternatively, one or more parametrized lattice RUC models may be generated during the lattice structure design process. The parametrized RUC models are each a unit cell of a lattice structure that is repeated through the design space to produce the lattice material. For example, the parametrized RUC model is the smallest volume over which a measurement can be made that will yield a value representative of the entire lattice material.

Characterizing the lattice cells provides homogenized material properties of the lattice cells as a function of the relative density of the cell. For example, a virtual material characterization 203 of a cubic lattice cell will determine the material properties of the cubic lattice cell. The material characterization is a virtual material characterization such that there is no need to perform a physical test of the lattice cell during the design process, or in order to determine and utilize the material properties of the cell. Each parametrized RUC model, such as one model in a library of different parametrized lattice RUC models, is submitted to the virtual material characterization process in order to derive the corresponding material properties in form of normalized material curves. The virtual material characterization process can handle any kind of lattice cell type, using the parametrized RUC model submitted to the virtual material characterization process.

For example, the virtual material characterization process for each parametrized RUC model may determine the normalized Young's modulus curves 205 for the lattice cell as a function of the relative density of the cell. The normalized Young's modulus curve models the relative stiffness of the lattice cell. The virtual material characterization may use phase function models (e.g., based on level set method) in the homogenization process to provide the normalized Young's modulus curve for each of the characterized lattice cells. A normalized shear modulus curve and a normalized Poisson's ratio curve may also be provided by the virtual material characterization. Further, corresponding sizing functions are provided to determine the correct sizing geometry and CAE results for the lattice structure.

The normalized Young's modulus curves are also a function of the relative density of the cells. For example, polynomial functions, with identified parameters for each selected cell, represent the Young's modulus curve, shear modulus curve and the Poisson's ratio curve of the cell, respectively, as a function of the relative density of the cell. The curves are normalized and represent a scaling function of the base print material properties as a function of the relative density of the cell. In this way, the elastic properties of the different cells are obtained for an entire relative density range, independent of the base material that is used to produce them, and the curves are used throughout the entire design process.

At act 103, lattice zones for the lattice structure are identified using one of the parametrized lattice models. To identify the lattice zones, the entire design space is considered a homogenous lattice structure, and topology optimization is used to determine a density distribution for the lattice structure at each location in the design space. For example, for each location, a lattice zone may be determined based on the printability of each density distribution of the lattice structure. In this example, the printability is determined based on predetermined thresholds, such that: density distributions above a first density threshold (e.g., material is required) and below a second density threshold (e.g., highest density that a lattice structure may be printed) are designed as zones of lattice structure; density distributions above the second density threshold are designed as zones of bulk material (e.g., solid material); and density distributions below the first threshold are designed as zones of no material.

Figure 3:
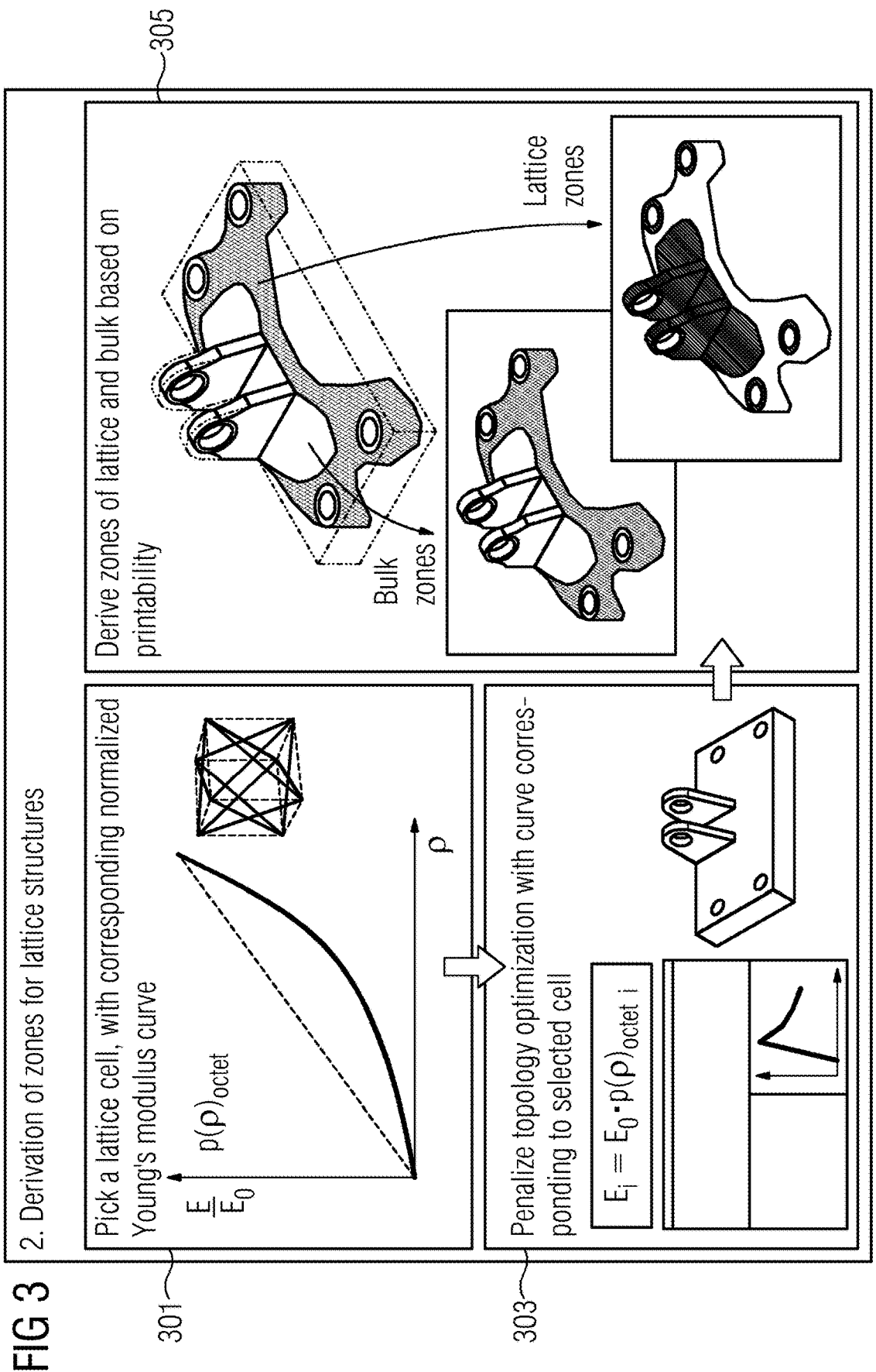
FIG. 3 illustrates an example of deriving lattice zones for lattice structures.

FIG. 3 illustrates an example of deriving lattice zones for lattice structures. At 301, a parametrized lattice model of an octet cell structure is chosen for the design space. For example, the octet cell structure may be chosen from a library of lattice cells based on the material properties of the cell structure, such as the normalized Young's modulus curve. In this example, when octet cell structure is chosen, the corresponding lattice material curve is assigned to the CAE design space and topology optimization is performed for the structural component using the homogenized octet cell structure material. Optimal zones for the lattice material are determined based on the topology optimization adapted for chosen lattice cell with the assigned lattice material curves. As discussed above, the topology optimization is performed considering the entire design space as lattice material. The lattice material is represented by the density dependent material property curves defined by the chosen lattice cell, and the topology optimization derives the correct distribution of lattice densities.

For example, at element 303, the topology optimization is penalized with the material properties of the chosen lattice cell. The topology optimization may utilize solid isotropic material with penalization (SIMP) material laws, or another topology optimization scheme. The penalization is performed using the normalized Young's modulus curve of the selected lattice cell. For example, Equation 1 may be used for the penalization:

$$E_i = E_0 p(\rho)_i \qquad \text{Eq. 1}$$

where $E_i$ is the scaled Young's modulus of a finite element of the model, $E_0$ is the nominal Young's modulus of the material of the build and $p(\rho)_i$ is the normalized Young's modulus curve of the selected lattice cell used as a penalization function for the given finite element. The entire design space is considered as a lattice material of the chosen cell type, and topology optimization determines the lattice density distribution according to the loads and constraints of the given application (e.g., the characteristics and requirements of the structural component). During the topology optimization, the lattice material is considered to be a density dependent homogenized material. The density dependent normalized elastic properties of the selected lattice cell are assigned within the design space, and the optimizer determines the optimal density distribution of the lattice structure. For example, the density may be between zero (0%) and one (100%).

At 305, zones of lattice and bulk material are assigned based on printability. For example, during manufacturing, such as additive manufacturing using three-dimensional printing, the manufacturing aspects and limitations with regard to each cell material and the manufacturing technology used are considered. For example, below a certain density threshold, such as 0.25 (25%), lattice cells are too small and cannot be printed. Likewise, above a certain density threshold, such as 0.80 (80%), lattice cells cannot be printed (e.g. the cells trap the powder or get coagulated). Utilizing the manufacturing aspects and limitations, lattice zones are determined. For example, a first density limit, below which no material should be printed (e.g., a VOID zone for densities below 0.25) and a second density limit is set above which bulk material should be printed to avoid powder trapping and coagulation (e.g., a BULK zone for densities above 0.80) are set. Lattice structures are printed for densities between the first density limit and the second density limit (e.g., LATTICE zone for densities between 0.25 and 0.80). The thresholds presented here are exemplary and depend on the manufacturing limitations of the process and materials.

At act 105, a geometry size is determined for the lattice structure. For example, sizing functions associated with the cell type are used to determine the geometry size of the lattice structure. Using the sizing functions, diameters of trusses within each cell of the lattice structure are determined. At the end of this process, the model may be submitted to the additive manufacturing machine for 3D printing.

Figure 4:
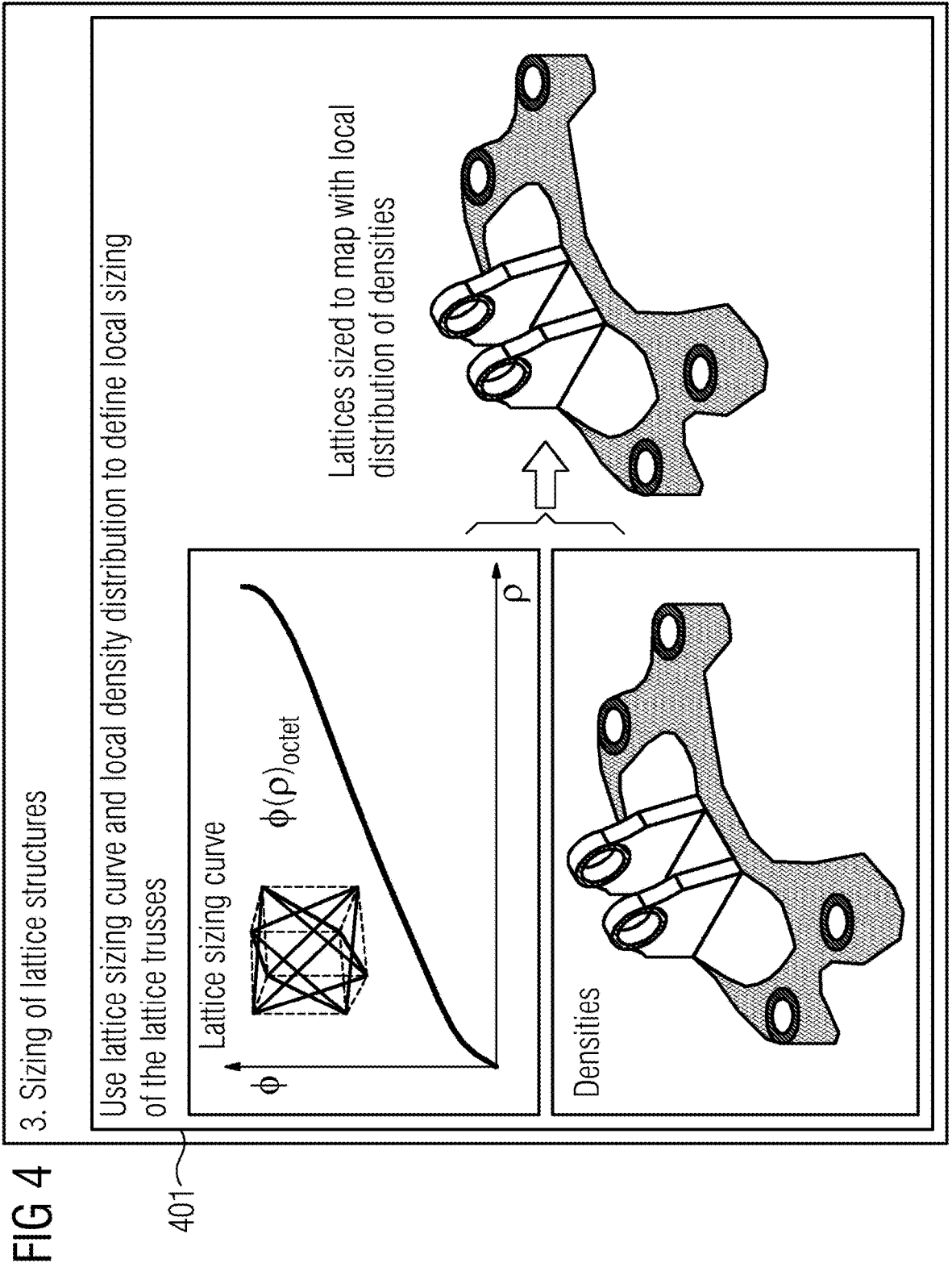
FIG. 4 illustrates an example of determining the geometry size for the lattice structures.

FIG. 4 illustrates an example of determining the geometry size for the lattice structures. At 401, lattice sizing curves are used with the local density distribution of the lattice cells to size the geometry of the lattice structures. For example, after the topology optimization has determined where the lattice material of a selected type should be provided and with what density distribution the lattice structure should have for optimal part stiffness, the actual geometry of the lattice is determined by sizing the lattice tissues. For each lattice zone, the geometry size of the latice structure is determined such that the actual density of the lattice cell matches the local density derived from topology optimization. Using a lattice sizing curve and the local density distribution, the local sizing of the lattice trusses for each lattice zone is defined.

For example, when the parametrized lattice models are defined, an analytical sizing function is also defined for each cell model. The analytical sizing function is used to determine truss diameters for the chosen cell type at the required relative density. Because the analytical sizing curves are relative and normalized, the user may choose the outer dimensions of the of the lattice unit cell model (e.g., the length, width and height of the bounding box) being used to fill in the designated lattice zone. The ratio of the outer dimensions of the lattice unit cell model matches the aspect ratio of the bounding box of the cell. The diameters of the trusses within each cell are determined using the sizing functions, the density distribution determined by topology optimization and the outer dimensions. Thus, the density of the sized cell geometry corresponds to the density determined by topology optimization. After sizing the truss diameters, the actual lattice cell geometries may be printed having the required actual density distribution mapped to the densities obtained from topology optimization.

Thus, in act 105, the actual geometries of the individual cells are determined, providing a lattice design that may be submitted to the printer for additive manufacturing of the structural component with lattice structures matching the density distribution determined by topology optimization. Beam elements, connecting the end-points of the trusses with-in the cells and capable of modeling the transmission forces and moments, may be used for the finite-element analysis to reduce the computational complexity of the model. However, certain errors are introduced into the finite-element model by using the beam elements, such as failing to account for common material between different beams at joints of the lattice structure and numerical errors due to eventual bad beam aspect ratios. In the overall CAE design process, additional attributes of the lattice structure may be of interest for further analysis and testing, such as testing fatigue and/or buckling. Thus, corrections may be applied to obtain correct finite-element results.

At act 107, the geometry size of the lattice structure is corrected for finite-element modeling. The finite-element modeling allows for simulating stresses and loads on the lattice structure, including fatigue and buckling analysis. As such, correcting the model for the finite-element analysis accurately predicts the response of the lattice structure to loads. For example, the diameters of lattice trusses are corrected to account for beam modeling.

Figure 5:
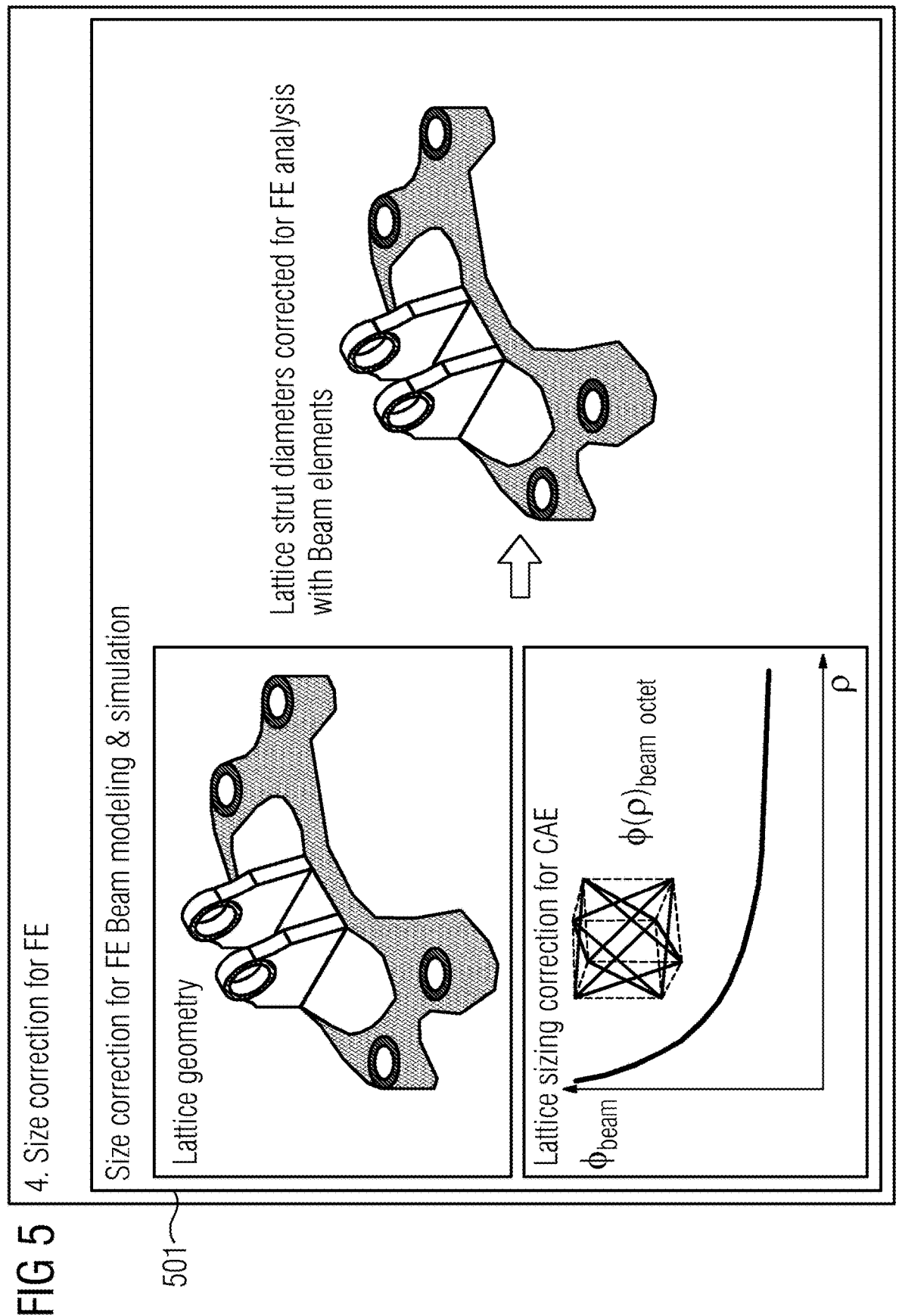
FIG. 5 illustrates an example of correcting the geometry size of the lattice structure for finite-element analysis.

FIG. 5 illustrates an example of correcting the geometry size of the lattice structure for finite-element analysis. The diameters of the lattice trusses are corrected for accurate beam modeling and simulation in finite-element analysis. For example, where the trusses of the lattice cells are modeled with beam elements, a correction is applied on the truss diameters to compensate for the error introduced by low aspect ratio beams and for the joints where the trusses are joined. An analytical correction function is identified for the each cell type in the parametrized lattice models, and using the analytical correction function, correct structural results are determined for the beam elements. For example, the analytical correction function is used to adjust the beam diameters within the lattice cells based on the density of the cell.

At act 109, the lattice structure may be printed using additive manufacturing. For example, using optimized model of the structural component from the topology optimization and the actual lattice cell geometries, the structural component may be manufactured. For example, the lattice structures and the bulk structures of the structural component are printed using a three-dimensional printer depositing or otherwise forming successive layers of material into the structural component. Other manufacturing methods may be used. For example, the manufactured structural component may satisfy the structural performance and weight requirements of aerospace components. Other applications of such kind can be, for example, in the domain of civil engineering (e.g., in the form of lightweight structural components), agricultural machine design (e.g., crane lifting arms and supports), and lightweight components for automotive, rail and ship building applications. The manufactured structural components may be for additional and different applications.

Figure 6:
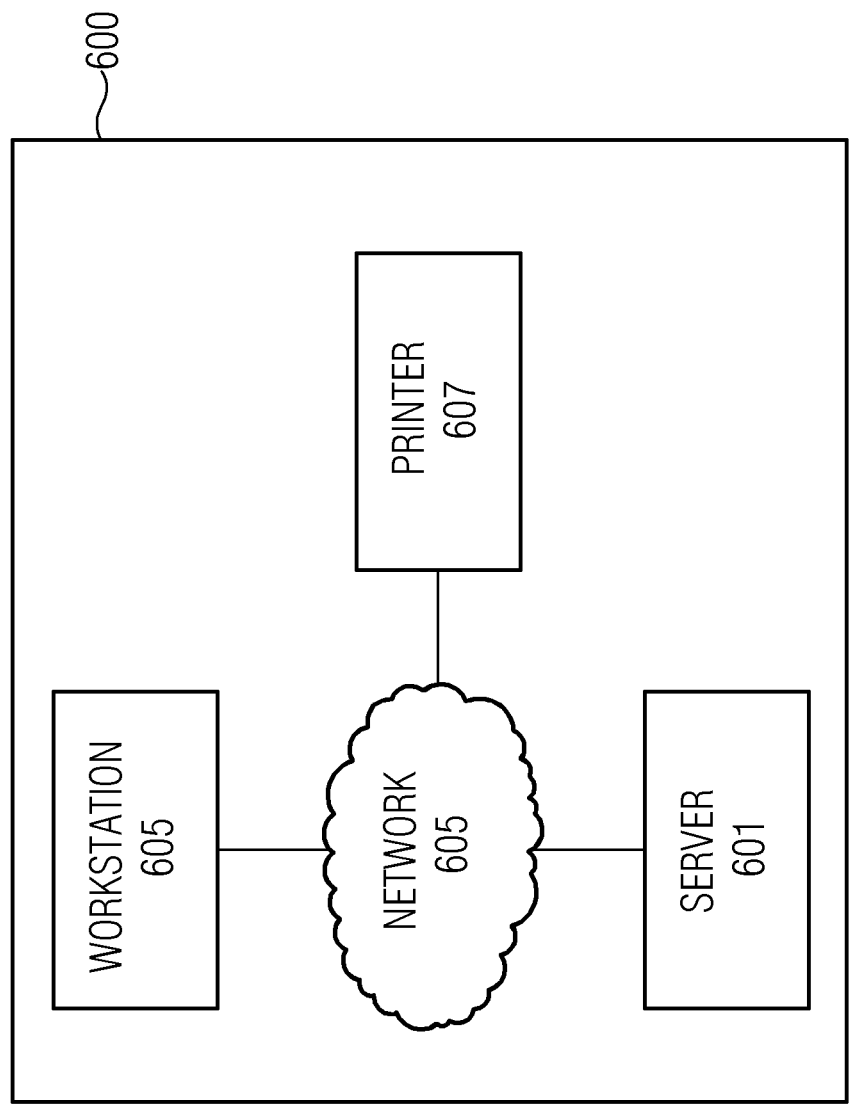
FIG. 6 illustrates an embodiment of a system for designing, modeling and manufacturing a lattice structure.

FIG. 6 illustrates an embodiment of a system for designing, modeling and manufacturing a lattice structure. The system 600, such as an additive manufacturing system, may include one or more of a server 601, a network 603, a workstation 605 and a printer 607. Additional, different, or fewer components may be provided. For example, additional servers 601, networks 603, workstations 605 and/or printers 607 may be used. In another example, the server 601 and the workstation 605 are directly connected, or implemented on a single computing device. In yet another example, the server 601, the workstation 605 and the printer 607 are implemented on a single additive manufacturing device. As another example, the workstation 605 is part of the printer 607, or the workstation 605 is directly connected to the printer 607. In yet another embodiment, the printer 607 performs the three-dimensional printing without being connected to the network 603, server 601, or workstation 605.

The server 601 is configured to generate and/or store one or more parametrized lattice models, and/or to transmit the parametrized lattice model to the workstation 605 via network 603. The parametrized lattice model is one of a plurality of parametrized lattice models, such as stored in a generated or preloaded model library.

The network 603 is a wired or wireless network, or a combination thereof. Network 603 is configured as a local area network (LAN), wide area network (WAN), intranet, Internet or other now known or later developed network configurations. Any network or combination of networks for communicating between the client computer 605, the printer 607, the server 601 and other components may be used.

The workstation 605 may be configured to receive a parametrized lattice model, identify lattice zones for the lattice structure using the parametrized lattice model and size a geometry for the lattice structure. The workstation 605 may also correct the geometry of the lattice structure for finite-element analysis.

The server 601 and/or workstation 605 is a computer platform having hardware such as one or more central processing units (CPU), a system memory, a random access memory (RAM) and input/output (I/O) interface(s). The server 601 and workstation 605 is implemented on one or more server computers connected to network 603. Additional, different or fewer components may be provided.

For example, the server 601 includes a processor, a communication interface, and a memory. The processor may be any processor suitable for the execution of a computer program include, by way of example, both general and special purpose microprocessors, and one or more processors of any kind of digital computer. Generally, a processor receives instructions and data from a read only memory, a random access memory or both. The server may be coupled to a database and a workstation 605. The workstation 605 may access the server. For example, workstation may access the parametrized lattice models stored in a database of the server 601. Additionally, the workstation 605 may access software stored on the server 601, such as software operable to perform topology optimization, lattice sizing and finite-element analysis. The server 601 may execute the software upon a request from the workstation 605.

For example, the workstation 605 includes a processor, a memory, an input device, a communication interface, and a display. The processor may be any processor suitable for the execution of a computer program. The input device may be one or more buttons, keypad, keyboard, mouse, stylist pen, trackball, rocker switch, touch pad, voice recognition circuit, or other device or component for inputting data and operating the workstation 605. For example, the user may select a parametrized lattice model, enter properties of the structural component and initiate functions of the workstation 605 using the input device. The input device and the display may be combined as a touch screen, which may be capacitive or resistive. The display may be a liquid crystal display (LCD) panel, light emitting diode (LED) screen, thin film transistor screen, or another type of display.

The printer 607 is configured to perform additive manufacturing, such as three-dimensional printing. The printer 607 is a three-dimensional printer. Other additive manufacturing devices may be used. The three-dimensional printer is configured to print the lattice structure. The lattice zones may be determined based on the printability characteristics of the printer 607 and the density distribution of the lattice structure. Different existing additive manufacturing technologies may be used, applicable to different materials (e.g. polymers, metals, etc.). For example Stereolithography, Laser Sintering, Fused Deposition Modelling, Polyjet Printing, Laser Melting, Electron Beam Melting, etc. may be used. The process may be also applicable to future technologies for manufacturing lattice structures. Different materials may be used for the additive manufacturing of the lattice structures, including Polyamide (PA), Alumide, printable resins, Acrylonitrile Butadiene Styrene (ABS), and metallic materials available for additive manufacturing, such as Titanium, Steel and Stainless Steel, Brass, Bronze, Copper, Aluminum, and precious metals like Silver and Gold. The process may be also applied to future materials as they become available for additive manufacturing.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A method for designing a lattice structure for additive manufacturing, the method comprising:
   receiving, by a processor, a lattice model providing material properties of a unit cell;
   identifying, with the processor, lattice zones for a density distribution of the lattice structure based on the lattice model and based on load requirements of the lattice structure; and
   determining, with the processor, geometry sizes for trusses of the unit cell based on the density distribution and based on a sizing function of the unit cell;
   wherein identifying the lattice zones comprises: considering an entire design space as the lattice structure, determining the density distribution of the lattice structure for each location in the design space based on the material properties of the lattice model, identifying the lattice zones based on printability of a density distribution of the lattice structure,
   wherein identifying the lattice zones based on the printability of the density distribution of the lattice structure comprises: identifying first zones, the first zones being lattice zones for density distributions above a first threshold and below a second threshold, identifying second zones, the second zones being bulk zones for density distributions above the second threshold, and identifying third zones, the third zones being zones of no material for density distributions below the first threshold.

2. The method of claim 1, wherein identifying lattice zones for the lattice structure based on the lattice model comprises performing a virtual material characterization to determine normalized material curves for the lattice structure.

3. The method of claim 1, wherein the lattice model is representative of the unit cell that, when repeated, produces the lattice structure.

4. The method of claim 1, wherein receiving the lattice model comprises receiving one lattice model from a plurality of lattice models based on the material properties derived from the one lattice model.

5. The method of claim 1, wherein the material properties of the unit cell of the lattice model comprises homogenized material properties.

6. The method of claim 1, wherein the material properties comprise a normalized Young's modulus curve, a normalized shear modulus curve and a normalized Poisson's ratio curve for the lattice structure.

7. The method of claim 1, wherein the material properties represent a normalized Young's modulus curve as a function of relative densities of unit cells of the lattice model.

8. The method of claim 1, wherein determining geometry sizes of the lattice structure comprises determining diameters of the trusses within each of the unit cells of the lattice structure.

9. A system for designing a lattice structure for additive manufacturing, the system comprising:
   a workstation configured to:
      receive a parametrized lattice model comprising material properties for a unit cell of the lattice structure;
      identify lattice zones characterizing a density distribution for the lattice structure using the parametrized lattice model and using load requirements of the lattice structure; and
      determine a size of a geometry for trusses of the unit cell based on the density distribution;
   a server in communication with the workstation, the server being configured to transmit the parametrized lattice model to the workstation, wherein the parametrized lattice model is one of a plurality of parametrized lattice models stored in a memory of the server or another server; and
   a three-dimensional (3D) printer in communication with the workstation, the server, or the workstation and the server, the 3D printer being configured to print the lattice structure;

wherein the identification of the lattice zones comprises identification of the lattice zones based on printability of a density distribution of the lattice structure, wherein the printability is based on characteristics of the three-dimensional printer; and wherein the identification of the lattice zones based on the printability of the density distribution of the lattice structure comprises: identification of the lattice zones for density distributions above a first threshold and below a second threshold, identification of bulk zones for density distributions above the second threshold; and identification of zones of no material for density distributions below the first threshold.

10. A method for modeling a lattice structure for additive manufacturing, the method comprising:

receiving a parametrized lattice model providing material properties of a unit cell;

identifying lattice density zones for the lattice structure using the parametrized lattice model; and determining a geometry size of a truss of the unit cell based on the lattice density zones;

wherein the identification of the lattice density zones comprises identification of the lattice density zones based on printability of a density distribution of the lattice structure, wherein the printability is based on characteristics of the three-dimensional printer, and wherein the identification of the lattice density zones based on the printability of the density distribution of the lattice structure comprises: identification of the lattice density zones for density distributions above a first threshold and below a second threshold, identification of bulk zones for density distributions above the second threshold; and identification of zones of no material for density distributions below the first threshold.

11. The method of claim 10, further comprising:

adjusting the geometry size of the truss of the unit cell; and finite-element modeling the lattice structure using the adjusted unit cell, the finite-element modeling comprising predicting response of the lattice structure to loads.

12. The method of claim 10, further comprising correcting diameters of lattice trusses for beam modeling with finite-element modeling.

13. The method of claim 10, further comprising modeling trusses of lattice cells as beam elements in finite-element modeling.

* * * * *